(12) United States Patent
LaVanish

(10) Patent No.: US 6,581,540 B1
(45) Date of Patent: Jun. 24, 2003

(54) BIRD FEEDER

(76) Inventor: George R. LaVanish, R.R. 3 Box 113A, Tyrone, PA (US) 16686

( * ) Notice: Subject to any disclaimer, the term of this patent is extended or adjusted under 35 U.S.C. 154(b) by 0 days.

(21) Appl. No.: 10/112,317

(22) Filed: Mar. 28, 2002

(51) Int. Cl.[7] ............................................... A01K 1/10
(52) U.S. Cl. .................... 119/51.01; 119/52.2
(58) Field of Search .................... 119/51.01, 58, 119/57.8, 52.1, 72, 52.2; 220/569

(56) References Cited

U.S. PATENT DOCUMENTS

| | | | | |
|---|---|---|---|---|
| 553,752 A | * | 1/1896 | Goff | 119/52.1 |
| 957,652 A | * | 5/1910 | Bush | 248/97 |
| 2,731,950 A | | 1/1956 | Davidson | |
| 2,787,248 A | | 4/1957 | Brendle | |
| 2,875,729 A | | 3/1959 | Gibson | |
| 3,945,344 A | * | 3/1976 | Melrath | 119/430 |
| 4,233,941 A | * | 11/1980 | Webster | 119/52.2 |
| 4,958,595 A | | 9/1990 | Richman et al. | |
| 5,016,572 A | | 5/1991 | Weber et al. | |
| 5,372,094 A | * | 12/1994 | Zens | 119/430 |
| 5,634,429 A | | 6/1997 | Loomis et al. | |
| 5,881,675 A | * | 3/1999 | Shaffer | 119/430 |

* cited by examiner

Primary Examiner—Charles T. Jordan
Assistant Examiner—Judith A. Nelson
(74) Attorney, Agent, or Firm—John J. Elnitski, Jr.

(57) ABSTRACT

A bird feeder that uses the standard size half-gallon rectangular milk type containers commonly used for liquids. The bird feeder includes a base having a front and back. A back support is attached near the back of the base. Two side supports are attached to the base and the back support. A front support is attached between the two side supports. A feed lip is attached to the base near the front of the base. A container area is formed by the front, back, and side supports and is sized just enough to receive and fit the milk type container. A container lip support mounted in the container area between the side supports and near the base to aid in retaining a lip of the milk type container in position.

16 Claims, 4 Drawing Sheets

BIRD FEEDER

BACKGROUND

There are many bird feeders currently on the market. Most of these bird feeders are designed to keep animals and even certain types of birds from using the bird feeder. These type of bird feeders are expensive, and can be difficult to set up and use.

It is an object of the present invention to provide a bird feeder which uses existing milk type containers filled with bird feed and is simple to use.

SUMMARY

A bird feeder that uses the standard size half-gallon rectangular milk type containers commonly used for liquids, such as milk or orange juice. The bird feeder includes a a base having a front and back. A back support is attached near the back of the base. Two side supports are attached to the base and the back support. A front support is attached between the two side supports. A feed lip is attached to the base near the front of the base. A container area is formed by the front, back, and side supports and is sized just enough to receive and fit the milk type container. A container lip support mounted in the container area between the side supports and near the base to aid in retaining a lip of the milk type container in position.

DETAILED DESCRIPTION

Figure 1:
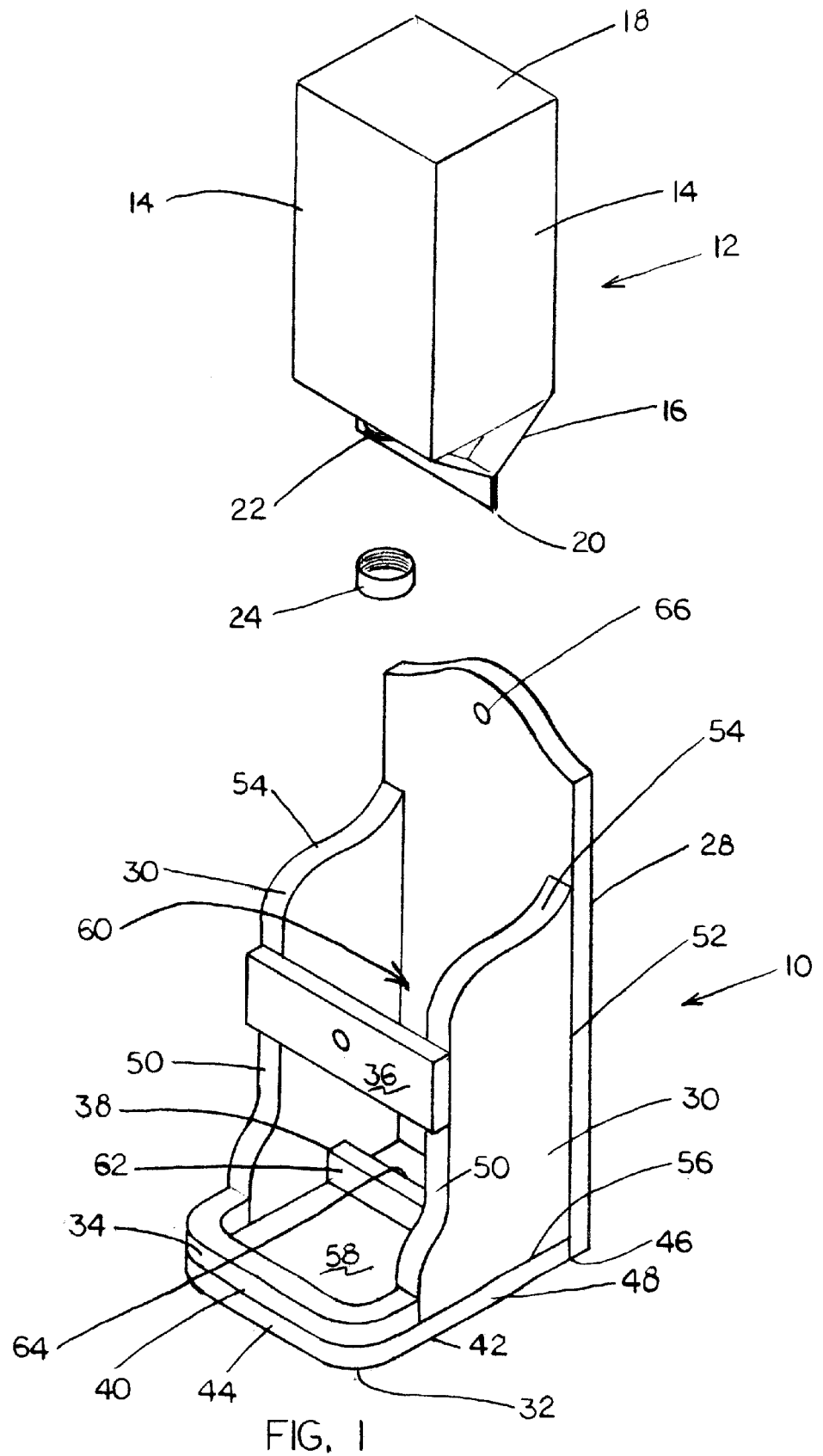
FIG. 1 is a perspective view of a bird feeder according to the present invention.
Figure 2:
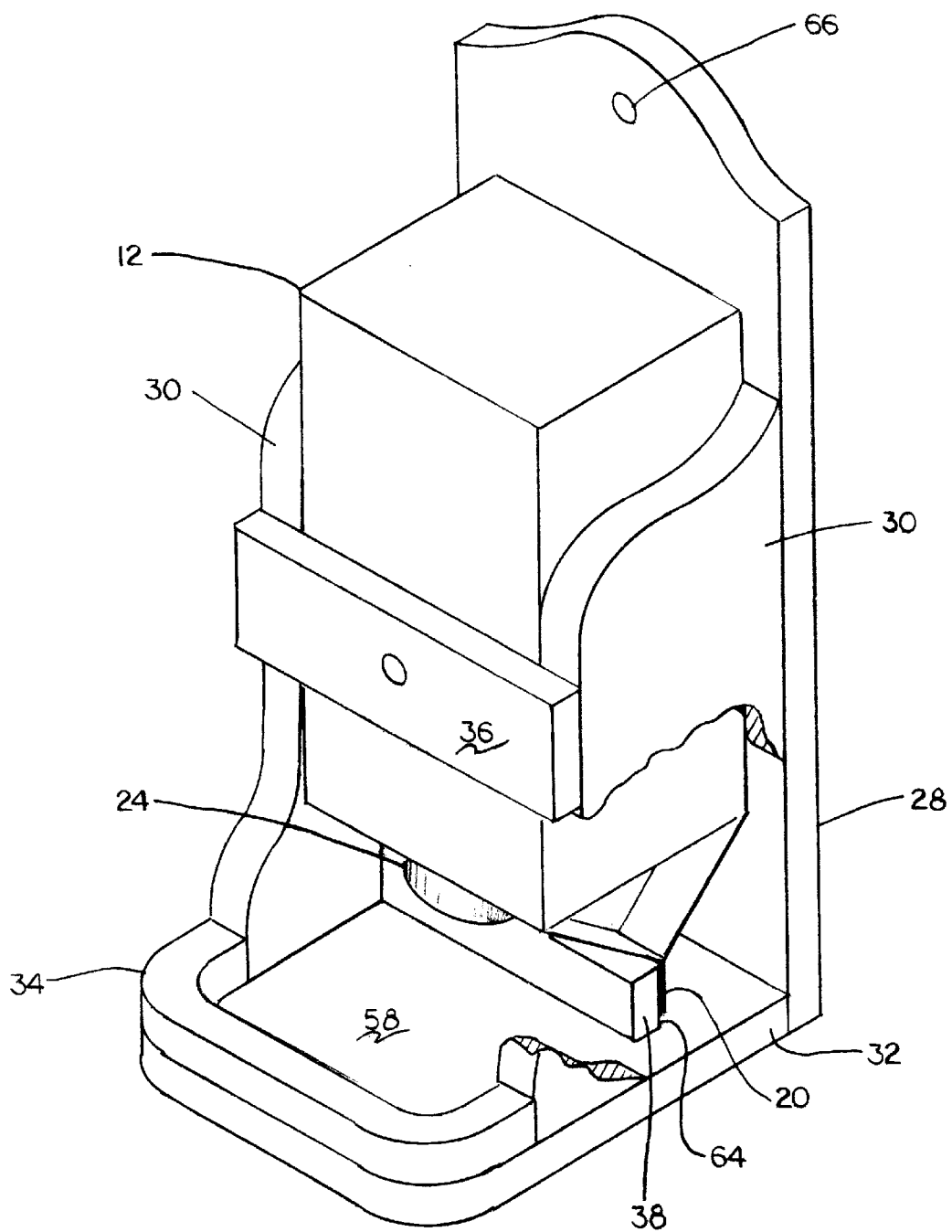
FIG. 2 is another perspective view of the bird feeder according to the present invention.
Figure 3:
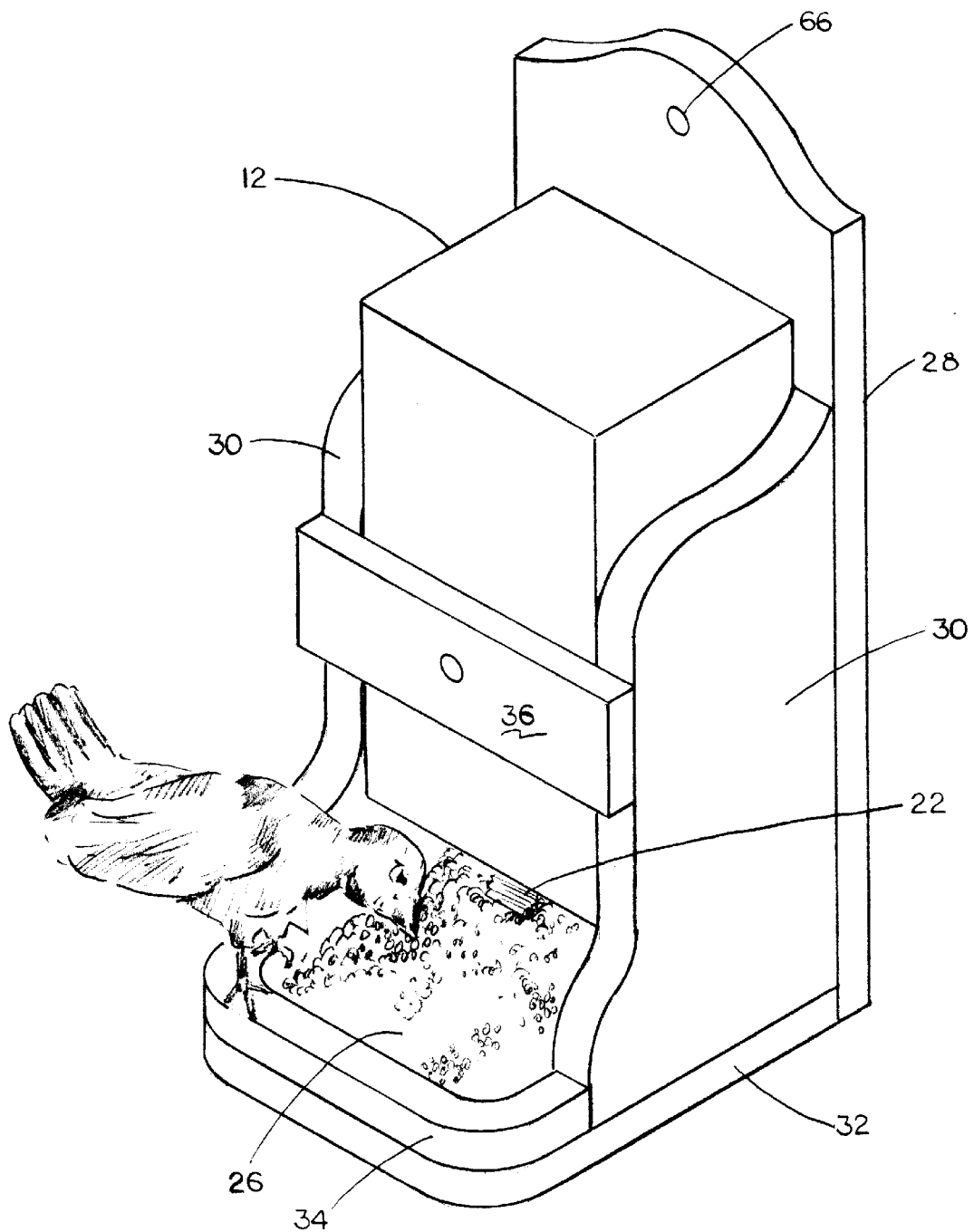
FIG. 3 is another perspective view of the bird feeder according to the present invention.

The present invention is a bird feeder that uses the standard size half-gallon rectangular milk type containers commonly used for liquids, such as milk or orange juice. The bird feeder 10 is shown in FIGS. 1–3 with a milk type container 12. The milk type container 12 is a rectangular box having four sides 14, a top 16 and a bottom 18. The bottom 18 is flat, so that the milk type container 12 may sit on a surface, such as a shelf or table. The top 16 is a triangular shape and includes a lip 20 that is common to milk or juice type containers. Some milk type containers used for packaging liquids now include a spout 22 and cap 24 in a side of the top 16, as shown in the FIGS. 1–3. The bird feeder 10 utilizes this milk type container 12 with the spout and cap, as part of the top. The milk type container 12 with the additional spout/cap 22, 24 can be supplied to the consumer filled with bird feed. The bird feeder 10 as described below allows the consumer to simply place the milk type container 12 in the bird feeder 10 and open the cap 24 to dispense the bird feed 26.

The bird feeder 10 of FIGS. 1–3 includes a back support 28, two side supports 30, a base 32, feed lip 34, front support 36 and container lip support 38. The base 32 includes a top 40, bottom 42, front 44 and a back 46, with two sides 48 between the front 44 and back 46. Each of the side supports 30 includes a front 50, back 52, top 54 and bottom 56. The bottom 56 of each side support is mounted to the top 40 of the base 32 along one of the sides 48 of the base 32. The back 52 of the side supports 30 are flush with the back 46 of the base 32. The back support 28 is attached to the back 52 of the side supports 30 and the back 46 of the base 32. In front of the side supports 30, the feed lip 34 is attached to the top 40 of the base 32 in the vicinity of the front 44 of the base 32. The feed lip 34 and the side supports 30 form a bird feed area 58 to hold dispensed bird seed from the milk type container 12. The front support 36 is attached to the front 50 of the side supports 30. The front support 36 spans the open area between the side supports 30. The front, back and side supports 36, 28, 30 form a container area 60 to receive the milk type container 12 full of bird feed 26. The front support 36 should be mounted at least half way up from the base 32 to retain the milk type container 12 in place. The container area 60 formed between the front, back and side supports 36, 28, 30 should just be large enough to allow the milk type container 12 to slide down into the container area 60, as shown in FIGS. 1–3. The container lip support 38 is mounted on top 40 of the base 32 in the container area 60 and between the side supports 30. The container lip support 38 is shown as a rectangular block having a front 62 and a back 64. The container lip support 38 is positioned such that the lip 20 of the milk type container 12 slides directly behind the back 64 of container lip support 38, as shown in FIGS. 1–3. The container lip support 38 acts to retain the milk type container 12 in an aligned position, while in the container area 60. The back support 28 includes a mounting hole 66. The mounting hole 66 allows mounting of the bird feeder 10 using a fastener or line to hang the bird feeder 10.

Figure 4:
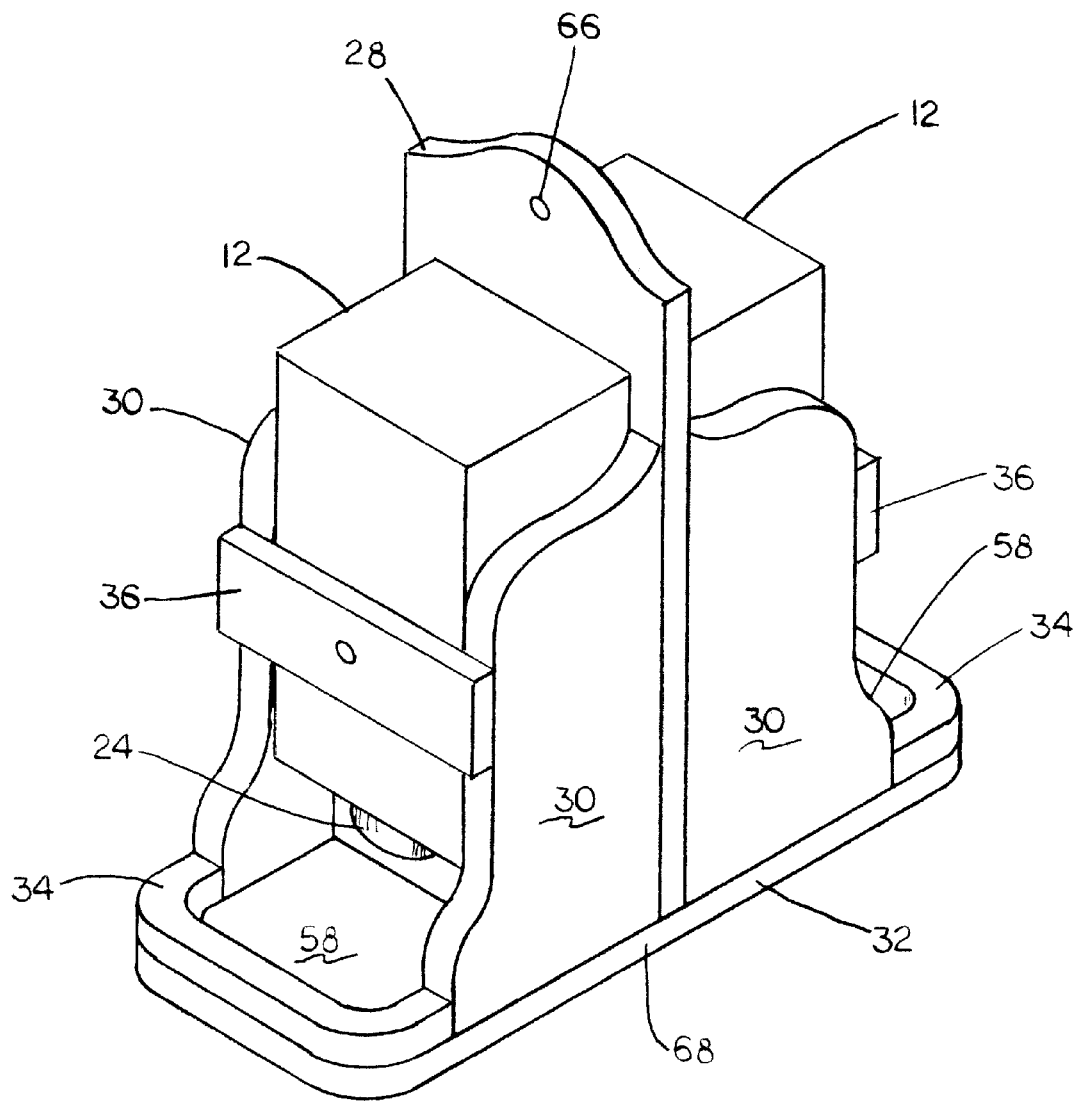
FIG. 4 is a perspective view of another embodiment of a bird feeder according to the present invention.

FIG. 4 shows another embodiment of the invention. In the FIG. 4 embodiment, the base 32 is longer. The back support 28 is mounted to the top 40 of the base 32 at the middle 68 of the base 32. Additional side supports 30, front support 36, feed lip 34 and container lip support 38 are added to provide a double feeder. As shown in FIG. 4, there are two sets of the side supports 30, front support 36, feed lip 34, and container lip support 38 which are all attached to the base 32 and back support 28. The two sets of the side supports 30, front support 36, feed lip 34, and container lip support 38 are attached in the same manner as described above for the embodiment of FIGS. 1–3.

The bird feeder 10 is used as follows. The milk type container 12 is placed into the container area 60 so that the spout/cap 22, 24 faces out into the bird feed area 58, as shown in FIGS. 1–2. Once the milk type container 12 is in place, the cap 24 is removed from the spout 22. The bird feed 26 then flows out due to gravity. The feed lip 34 and front bottom of the side supports 30 retain the bird feed 26 in the bird feed area 58. As the birds eat the bird feed 26, more bird feed 26 flows out due to gravity and refills the bird feed area 58. Once the milk type container 12 is empty, the milk type container 12 can be removed and recycled.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of any and all equivalents thereof.

I claim:

1. A bird feeder used in combination with a milk type container with a spout and cap for the spout, the combination comprising:

a base having a front and back;

a back support attached near said back of said base;

two side supports, each of said side supports attached to said base and said back support;

a front support attached between said two side supports;

a feed lip attached to said base near said front of said base;

a container area formed by said front, back, and side supports sized just enough to receive and fit the milk type container; and a container lip support mounted in said container area between said side supports and near said base to aid in retaining a lip of the milk type container in position.

2. The bird feeder of claim 1, wherein said side supports are mounted to a top of said base and backs of said side supports are flush with said back of said base; wherein said back support is mounted to said backs of said base and said backs of said side supports; wherein said front support is mounted to fronts of said side supports; and wherein said container lip support is mounted to said top of said base in said container area.

3. The bird feeder of claim 1, wherein said feed lip is connected to each of said side supports to form a bird feed area to receive bird feed from the milk type container.

4. The bird feeder of claim 2, wherein said feed lip is connected to each of said side supports to form a bird feed area to receive bird feed from the milk type container.

5. The bird feeder of claim 1, wherein said back support includes a mounting hole to hang said bird feeder.

6. The bird feeder of claim 2, wherein said back support includes a mounting hole to hang said bird feeder.

7. The bird feeder of claim 3, wherein said back support includes a mounting hole to hang said bird feeder.

8. The bird feeder of claim 4, wherein said back support includes a mounting hole to hang said bird feeder.

9. A bird feeder used in combination with two milk type containers with a spout and cap for the spout, the combination comprising:

a base having a front and back;

a back support attached between said back and front of said base;

two sets of two side supports, a set of said side supports attached between said back support and said base near said front of said base, a set of said side supports attached between said back support and said base near said back of said base;

a front support attached between each set of said two side supports;

a feed lip attached to said base near said front of said base;

a feed lip attached to said base near said back of said base;

a container area formed by each set of said front, back, and side supports which is sized just enough to receive and fit each of the two milk type containers; and a container lip support mounted in each of said container areas between said side supports and near said base to aid in retaining a lip of each of the two milk type containers in position.

10. The bird feeder of claim 9, wherein the side supports are mounted to a top of said base; wherein said back support is mounted to said top of said base; wherein each of said front supports are mounted to fronts of each of said side supports; and wherein each of said container lip supports are mounted to said top of said base in each of said container areas.

11. The bird feeder of claim 9, wherein each of said feed lips are connected to each of said side supports to form a bird feed area to receive bird feed from the milk type container.

12. The bird feeder of claim 10, wherein each of said feed lips are connected to each of said side supports to form a bird feed area to receive bird feed from the milk type container.

13. The bird feeder of claim 9, wherein said back support includes a mounting hole to hang said bird feeder.

14. The bird feeder of claim 10, wherein said back support includes a mounting hole to hang said bird feeder.

15. The bird feeder of claim 11, wherein said back support includes a mounting hole to hang said bird feeder.

16. The bird feeder of claim 12, wherein said back support includes a mounting hole to hang said bird feeder.

* * * * *